Jan. 22, 1952 L. W. PARKER 2,583,012

CLASS AB OPERATION OF HORIZONTAL SWEEP AMPLIFIER

Filed July 2, 1947

INVENTOR
Louis W. Parker
BY
Robert Harding Jr.
ATTORNEY

Patented Jan. 22, 1952 2,583,012

UNITED STATES PATENT OFFICE 2,583,012

CLASS AB OPERATION OF HORIZONTAL SWEEP AMPLIFIER

Louis W. Parker, Little Neck, N. Y., assignor to International Standard Electric Corporation, New York, N. Y., a corporation of Delaware Application July 2, 1947, Serial No. 758,688

5 Claims. (Cl. 250—27)

This invention relates to improvements in the methods and means for generating saw toothed waves and more particularly to class AB operation of horizontal sweep amplifiers. A class A amplifier is one in which the grid bias and alternating grid voltages are such that plate current in the tube flows at all times. A class AB amplifier is an amplifier in which the grid bias and alternating grid voltages are such that plate current in the tube flows for appreciably more than half but less than the entire electrical cycle. A class B amplifier is one in which the grid bias is approximately equal to the cut off value so that the plate current is approximately zero when no exciting grid voltage is applied and that the plate current flows in the tube for approximately half of each cycle when an alternating grid voltage is applied.

An object of this invention is the provision of simple and improved means for efficiently generating a sweep wave especially suitable for television receivers using magnetic deflection.

Another object is to take most of the power for producing the sweep wave from a class AB amplifier and only a small amount of energy from a class A amplifier to keep the sweep linear.

Horizontal sweep amplifiers in television receivers using magnetic deflection are required to deliver 30 or more volt amperes into the deflection yoke. Until the present time these amplifiers were operated in class A. This resulted in low efficiency, large tubes and to some extent was the cause of poor linearity. This invention alleviates these disadvantages.

A more detailed description of the invention follows and is illustrated in the accompanying drawing.

Figures 1, 2, 3:
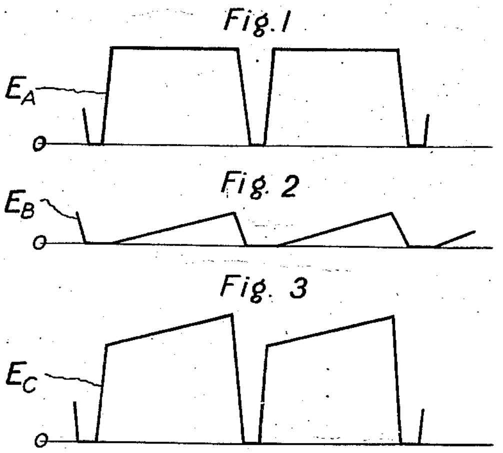
Figs. 1, 2 and 3 show voltage waves illustrative of amplifier performance.

The voltage wave required in the output of the sweep amplifier is shown by wave $E_C$ in Fig. 3. This wave is the sum of the two waves $E_A$ and $E_B$, shown in Figs. 1 and 2. Of these $E_A$ shows the voltage necessary to send a saw tooth current through an inductance and $E_B$ shows the voltage across the resistance for a similar saw tooth current. A practical yoke has both inductance and resistance. Consequently the voltage wave required for saw tooth current is as shown by $E_C$ of Fig. 3. Of these waves $E_A$ is much larger than $E_B$. For 0.4 ampere maximum peak to peak current variation at 31,500 cycles per second with a 5 mh. yoke the voltage $E_A$ is:

$$E_A=L\frac{dI}{dT}=5\times10^{-3}\frac{0.4}{28\times10^{-6}}=71 \text{ volts}$$

where $28\times10^{-6}$ seconds is the duration of the sweeping portion of one cycle. The maximum voltage $E_B$ max. across the resistance of a practical yoke of about 16 ohms, is:

$$E_B \text{ max.}=IR=0.4\times16=6.4 \text{ volts}$$

These illustrative values are of course the voltages which appear across the yoke on the low voltage side of the transformer. The plate side has voltages of the order of about three times the above values.

From the above it is seen that $E_A$ is about ten times the value of the maximum $E_B$. This is easily possible since due to the flat top of the wave the tube acts somewhat as a mechanical switch, either conducting with low internal impedance or not conducting at all. The saw tooth wave $E_B$ can be amplified by a low power class A amplifier.

Figure 4:
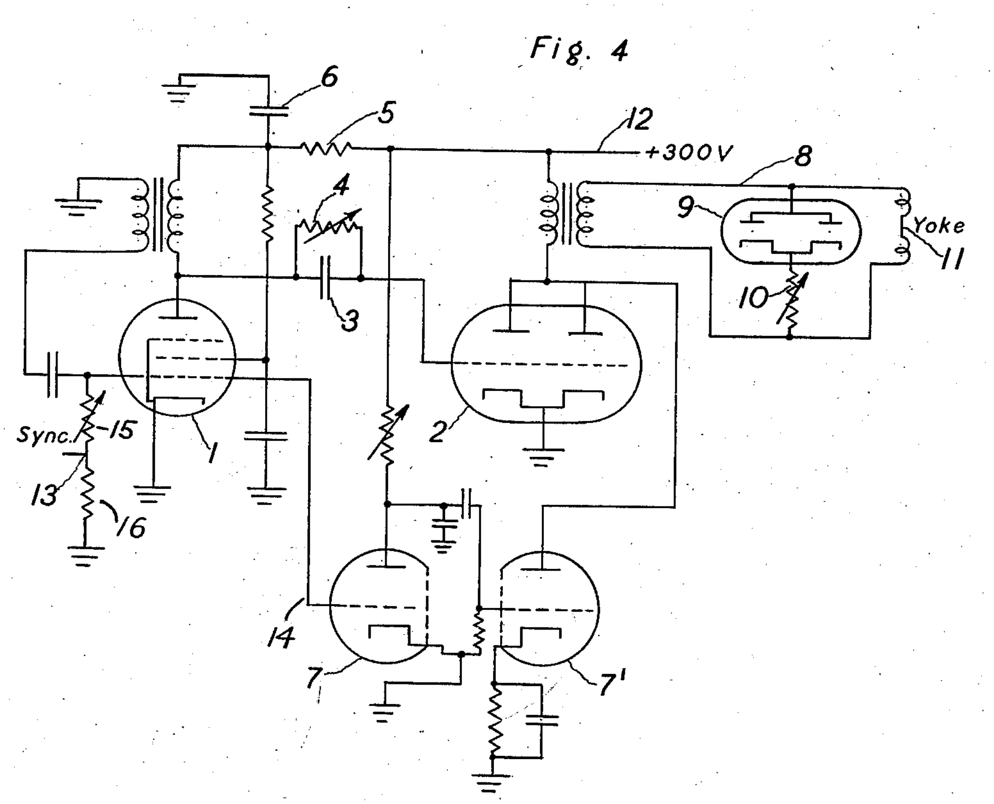
Fig. 4 is a diagrammatic circuit arrangement of this invention.

A circuit to accomplish the above is shown in Fig. 4. Pentode 1 is operated as a conventional blocking oscillator supplying narrow pulses in the negative direction to triode 2 through condenser 3. Variable resistance 4 across this condenser supplies the D. C. component to the grid of triode 2. The net effect in the plate circuit of triode 2 is a heavy current, due to the positive grid bias, for about $\frac{9}{10}$ of the cycle. After this there is a rapid cut off lasting for $\frac{1}{10}$ of the cycle. If condenser 3 has a high capacity there is substantially no variation in the plate current during either part of the cycle, only a rapid change from one part to another. This condition is shown by curve $E_A$ in Fig. 1. Variable resistance 4 determines the extent of the positive bias on triode 2, which in turn will determine the amplitude of the sweep.

Waves which increase in amplitude slightly as the cycle progresses can be generated if condenser 3 is of such value that it permits a slight rise of voltage across it during the sweeping part of the cycle and the positive bias is increased the proper amount during this period. In this manner the proper voltage wave for saw tooth current can be generated by the output tube.

Another method is to provide isolating resistance 5 and bypass condenser 6 in the plate circuit of tube 1 of such values that during the sweeping part of the cycle the voltage across this bypass condenser rises a small amount and suddenly drops when tube 1 draws plate current. In this way two tubes and a damping rectifier are sufficient to operate the sweep.

It cannot be expected that the saw tooth component of the wave, as shown at $E_B$ in Fig. 2 will be very accurate when using either of the above methods. Another tube operated as a class A amplifier can produce a more accurate sweep wave. Such a tube 7 shown in Fig. 4 as a double triode, generates a saw tooth wave by using the conventional discharge tube circuit. This wave is amplified by the second triode 7' in the tube 7 and is applied in parallel to the output of tube 2. The output saw tooth wave is transmitted, by circuit 8 having a damping shunt of tube 9 and variable resistance 10, to the magnetic deflection yoke 11 of a scanning receiving tube. The plate circuits of the tubes are connected at 12 with a source of positive potential. Positive synchronizing pulses from a source (not shown) are impressed upon the oscillator 1 at 13 and are simultaneously impressed upon the grid of the saw tooth generator 7 over conductor 14. Negative saw tooth waves are derived from the anode of triode 7 and are fed to the grid of amplifier 7'. The pulses are in the same time phase relationship as the negative pulses which are applied to the grid of tube 2 from the oscillator 1, so that the output waves derived respectively from tubes 2 and 7' coincide in phase time relation as shown by the wave form indicated in Fig. 3.

This system, besides its obvious advantages, is also capable of generating a more accurate saw tooth current in the yoke than conventional systems. The reason is that the output of tube 2 can be made nearly perfect since during the sweeping cycle no signal voltage is applied to its grid, only the positive potential from the plate supply. The small amount of saw tooth wave voltage can be made quite exact by using only a part of the grid swing of the class A amplifier. The power dissipated in the class AB tube is very low since the voltage drop across it during the time that plate current is passed can be made as low as 30 volts. In doing this however the class A tube plate voltage drops, therefore the grid of this tube must be connected to a more negative point than that of the class AB tube. It will be observed that the grid of tube 7 receives negative bias over conductor 14, variable resistor 15 and fixed resistor 16, whereas tube 2 receives a positive grid bias over variable resistor 4, fixed resistor 5 from the 300 volt supply source.

While I have illustrated and described above embodiments of the invention, it should be understood that these embodiments are merely by way of illustration and are not intended as a limitation of the invention. Modifications apparent to one skilled in the art are to be considered part of the invention as defined in the accompanying claims.

What is claimed is:

1. In combination, in a sweep amplifier adapted to be driven by a source of periodic pulses, a source of operating potential, a blocking oscillator for supplying narrow pulses, a first triode biased to operate in class AB condition, means to couple the output of said oscillator to the input of said first triode, said first triode adapted to produce a flat-topped wave output, a second triode biased to operate in class A condition, a resistance serially connected between said potential source and the anode of said second triode, a condenser serially connected between the anode and cathode of said second triode, said second triode adapted to produce a saw tooth wave output, means to amplify the output of said second triode, means to couple the output of said second triode with said amplifying means, means to couple said oscillator and said second triode to said pulse source, an output circuit common to said first triode and said amplifying means, and means for combining the flat top waves derived from said first triode and the saw tooth waves derived from said amplifying means for transmission by said output circuit.

2. A sweep amplifier comprising a space discharge device operating as a blocking oscillator for supplying narrow pulses in the negative direction to a triode discharge device, means for supplying from the output of said oscillator pulses to the grid of said triode, means for supplying from the output of said oscillator a direct current component to the grid of said triode, a third space discharge device using a conventional discharge tube circuit for generating a saw toothed wave, means for applying in parallel the last mentioned saw toothed wave to the output of the said triode device, and an output circuit leading from said triode.

3. In combination, in a sweep amplifier as claimed in claim 1, wherein said first triode further comprises an input circuit and an output circuit, both said input circuit and said output circuit connected to said potential source to cause a large amount of current to flow in said output circuit, said oscillator coupled to said input circuit for blocking the flow of current in said output circuit, and wherein said second triode includes biasing means to cause operation thereof in linear class A condition.

4. A sweep amplifier comprising a source of operating potential, a first triode discharge device, having a grid and means connected thereto for positively biasing said grid, a blocking oscillator coupled to the grid of said first triode for supplying narrow pulses in the negative direction to the grid of said triode to cut off said triode whereby said triode generates high-power flat-top waves, a second triode discharge device, a resistance and capacitance discharge circuit serially connected between said potential source and said second triode for generating a saw-toothed wave, said second triode having a grid and means connected thereto for biasing said second triode for class A operation, means for applying in parallel the last-mentioned saw-toothed wave to the output of said first triode, and a source of synchronizing pulses connected to said blocking oscillator and to the grid of said second triode.

5. A sweep amplifier comprising a source of operating potential, a flat top wave generator including a triode and means connected between said potential source and the grid of said triode for positively biasing said grid to cause large plate current to flow and a blocking oscillator coupled to the grid of said first triode for supplying narrow pulses in the negative direction to the grid of said triode to cut off said triode, a saw-tooth wave generator including a linear class A amplifier, means for applying in parallel the outputs of said saw-toothed wave generator and said flat-top wave generator, and means connected to said blocking oscillator and to said saw-toothed wave generator for applying synchronizing pulses thereto.

LOUIS W. PARKER.

REFERENCES CITED

The following references are of record in the file of this patent:

UNITED STATES PATENTS

| Number | Name | Date |
|---|---|---|
| 2,196,845 | Andrieu | Apr. 9, 1940 |
| 2,312,203 | Wallace | Feb. 23, 1943 |
| 2,313,971 | Roe | Mar. 16, 1943 |
| 2,488,297 | Lacy | Nov. 15, 1949 |